(12) United States Patent
Yotsumoto et al.

(10) Patent No.: US 6,938,318 B2
(45) Date of Patent: Sep. 6, 2005

(54) METHOD FOR COLLECTING A FOAM RESIN FROM A HOUSING OF A REFRIGERATOR

(75) Inventors: Mikio Yotsumoto, Ibaraki (JP); Yutaka Matsuda, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 357 days.

(21) Appl. No.: 10/181,101

(22) PCT Filed: Sep. 20, 2001

(86) PCT No.: PCT/JP01/08212

§ 371 (c)(1),
(2), (4) Date: Jul. 11, 2002

(87) PCT Pub. No.: WO02/40238

PCT Pub. Date: May 23, 2002

(65) Prior Publication Data

US 2003/0029562 A1 Feb. 13, 2003

(30) Foreign Application Priority Data

Nov. 16, 2000 (JP) ........................................ 2000-348962

(51) Int. Cl.[7] .............................................. B23P 19/04
(52) U.S. Cl. ...................... 29/403.3; 29/426.4; 156/344
(58) Field of Search ............................. 29/403.3, 403.2, 29/403.1, 403.4, 426.3, 426.4, 239; 156/344, 584

(56) References Cited

U.S. PATENT DOCUMENTS

| | | | |
|---|---|---|---|
| 1,821,482 A | 9/1931 | Schutte | |
| 2,159,439 A | 5/1939 | Leighton | |
| 2,244,577 A | 6/1941 | Schreiber | |
| 3,504,621 A | 4/1970 | Qualheim | |
| 3,645,199 A | 2/1972 | Kanna | |
| 3,716,196 A | 2/1973 | Motek et al. | |
| 3,931,793 A | 1/1976 | Kolibas | |
| 4,369,700 A | 1/1983 | Flagg | |
| 4,531,950 A | 7/1985 | Burt | |
| 4,723,507 A | 2/1988 | Ovshinsky et al. | |
| 5,074,477 A | * 12/1991 | Welter et al. | 241/18 |
| 5,251,824 A | 10/1993 | Adelmann | |
| 5,304,276 A | * 4/1994 | MacLeod et al. | 156/344 |
| 5,500,072 A | * 3/1996 | Fujimura et al. | 156/344 |
| 5,678,773 A | 10/1997 | Takamura et al. | |
| 5,826,631 A | 10/1998 | Gold et al. | |

(Continued)

FOREIGN PATENT DOCUMENTS

| | | |
|---|---|---|
| DE | 39 06 516 | 9/1990 |
| DE | 39 11 596 | 10/1990 |
| DE | 41 33 592 | 4/1993 |

(Continued)

*Primary Examiner*—David P. Bryant
(74) *Attorney, Agent, or Firm*—Hamre, Schumann, Mueller & Larson, P.C.

(57) ABSTRACT

A method for disassembling a discarded refrigerator that uses a foamed resin as a heat insulator according to the present invention includes the processes of cutting and separating a heat-insulating housing of a refrigerator into pieces having a predetermined size and shape; obtaining the foamed resin by passing the pieces between a pair of compression rollers arranged so as to oppose each other and compressing the pieces, thereby peeling off and separating an incompressible plate-like object layered at least on one surface of the pieces; and collecting a foaming gas by passing the foamed resin (301) between a pair of compression rollers (331, 332) arranged so as to oppose each other and compressing the foamed resin, thereby allowing the foaming gas in the foamed resin to leak out. This makes it possible to collect a foaming gas in a heat insulator while maintaining a high concentration with small equipment at low cost.

6 Claims, 8 Drawing Sheets

U.S. PATENT DOCUMENTS

| | | |
|---|---|---|
| 5,882,558 A | 3/1999 | Bacher et al. |
| 6,131,509 A | 10/2000 | Davis |
| 6,203,113 B1 | 3/2001 | Wendel |
| 6,408,637 B1 | 6/2002 | Hanson et al. |
| 6,598,813 B1 | 7/2003 | Matsuda |
| 6,732,416 B1 * | 5/2004 | Jacobsen et al. ........... 29/403.3 |
| 6,802,997 B2 * | 10/2004 | Uekado et al. ............ 264/45.1 |
| 2003/0029562 A1 | 2/2003 | Yotsumoto et al. |
| 2004/0145071 A1 | 7/2004 | Yotsumoto et al. |

FOREIGN PATENT DOCUMENTS

| | | |
|---|---|---|
| EP | 0 606 891 | 7/1994 |
| EP | 0 949 068 | 10/1999 |
| JP | 51-22775 | 2/1976 |
| JP | 52-136457 | 12/1977 |
| JP | 56-98134 | 8/1981 |
| JP | 3-500857 | 2/1991 |
| JP | 6-184348 | 7/1994 |
| JP | 8-5232 | 1/1996 |
| JP | 8-45904 | 2/1996 |
| JP | 8-851114 | 4/1996 |
| JP | 9-68325 | 3/1997 |
| JP | 9-68329 | 3/1997 |
| JP | 9-300127 | 11/1997 |
| JP | 10-193359 | 7/1998 |
| JP | 11-314084 | 11/1999 |
| JP | 2000-102923 | 4/2000 |
| JP | 2000-10293.3 | 4/2000 |

* cited by examiner

METHOD FOR COLLECTING A FOAM RESIN FROM A HOUSING OF A REFRIGERATOR

TECHNICAL FIELD

The present invention relates to a method for collecting only a foamed resin by peeling off and removing a steel plate and a resin plate from a layered body in which the steel plate and the resin plate are layered on the foamed resin, and a device therefor.

The present invention also relates to a method for collecting a foaming gas contained in a foamed resin, and a device therefor.

Furthermore, the present invention relates to a method for disassembling a refrigerator, in which a heat-insulating housing of a refrigerator that uses a foamed resin as a heat insulator is disassembled so as to collect a foaming gas contained in the foamed resin.

BACKGROUND ART

Generally, a heat-insulating housing of a refrigerator is formed of a layered body including a steel (including iron and cast iron) plate as an outer wall material, a resin plate as an inner wall material and a heat insulator interposed between the steel plate and the resin plate. The heat insulator is made of a foamed resin such as urethane foam, and chlorofluorocarbons conventionally have been used as a foaming gas therefor. Since chlorofluorocarbons may destroy the ozone layer, it is necessary to collect and prevent them from diffusing into the air at the time of disposing of a refrigerator. It also is desired that the steel plate and the resin plate should be collected for recycling. Furthermore, in some cases where linear objects such as pipes (for example, copper pipes) through which a refrigerant passes and electrically conductive wires are embedded in the heat insulator, it is desired that they should be separated from the heat insulator and collected.

Conventionally, a discarded refrigerator has been disassembled as follows.

First, refrigerant (for example, chlorofluorocarbons) and refrigeration oil are collected from the discarded refrigerator, and then the compressor is removed (a first separating process). The resultant heat-insulating housing of the refrigerator is put into a peeling and smashing machine. The peeling and smashing machine is provided with a rotating cylindrical body having many rotating and projecting blades on its outer periphery. The peeling and smashing machine roughly smashes the heat-insulating housing of the refrigerator into pieces having a size on the order of several cm and separates the outer wall material (steel plate), the inner wall material (resin plate), the linear object and the heat insulator (urethane foam). At this time, some of the closed-cells in the heat insulator are destroyed, thus releasing the chlorofluorocarbons. These chlorofluorocarbons are collected by equipment for collecting low-concentration chlorofluorocarbons.

The steel plate, the resin plate, the linear object and the foamed resin that have been smashed roughly are separated by a wind-power separator utilizing the difference in specific gravity or the like.

The separated foamed resin is sent to a crusher and smashed further minutely, so that remaining chlorofluorocarbons are drawn out. As a method for collecting the chlorofluorocarbons for this case, a method described in JP 2679562 B is known, for example. After the foamed resin is smashed roughly into pieces having a size on the order of several cm, it is put into a hopper and sent to a crusher. In the process where an external mechanical force is applied in the crusher so as to crush the foamed resin, closed-cells therein are destroyed. Chlorofluorocarbons released from the closed-cells and the minutely crushed resin grains are sent to a bag filter together with the air, so that a gaseous component and the resin grains are separated. When the resin grains are heated and compressed in a volume reducer, any remaining chlorofluorocarbons are squeezed out also at this time. The chlorofluorocarbons generated in the above process are sent to a condenser together with the air and cooled down, so that the chlorofluorocarbons are liquefied and separated, and then the gas that is not condensed is sent back to the hopper. In this manner, the chlorofluorocarbons contained in the foamed resin can be separated and collected without being diffused into the air.

However, the above-described disassembling method has had the following problems.

The heat-insulating housing of the refrigerator after the first separating process has to be smashed roughly into pieces having a size on the order of several cm by the peeling and smashing machine in order to separate the foamed resin and other members. At this time of rough smashing, the closed-cells in the foamed resin are destroyed, thus releasing a slight though certain amount of chlorofluorocarbons. Accordingly, a process of collecting these chlorofluorocarbons is necessary. In addition to this, since the chlorofluorocarbons are contained in the air including the roughly smashed foamed resin to be separated by a wind power, they have an extremely low concentration.

Moreover, even after minutely crushing the foamed resin, in order to separate the foamed resin grains and the released chlorofluorocarbons, a mixture thereof is sent with the air to the bag filter, so that they are separated by utilizing a wind power. Thus, since the chlorofluorocarbons are diffused in the carrier air, the concentration of the chlorofluorocarbons becomes extremely low.

As described above, in the conventional method for disassembling the refrigerator, the condensation and separation of the chlorofluorocarbons diffused in an extremely low concentration are by no means efficient. Furthermore, the equipment for carrying out these processes is large, raising equipment costs considerably.

Moreover, the peeling and smashing machine, the wind-power separator, the crusher, the bag filter and equipment attached to them generally are very large, which require a large sealed installation space and cost much.

DISCLOSURE OF INVENTION

It is an object of the present invention to solve the problems described above and to provide a method for collecting a foamed resin, which makes it possible to separate and remove other members (a steel plate, a resin plate, etc.) from the foamed resin at low cost within a relatively small space while generating substantially no foaming gas, and a device therefor.

It is a further object of the present invention to provide a method for collecting a foaming gas, which makes it possible to collect a foaming gas in a foamed resin while maintaining a high concentration and reduce cost without increasing the size of equipment for collecting and an installation space, and a device therefor.

Furthermore, it is an object of the present invention to provide a low-cost method for disassembling a refrigerator, which makes it possible to collect a foaming gas while maintaining a high concentration without increasing the size of equipment for collecting and an installation space.

In order to achieve the above-mentioned objects, the present invention has the following configuration.

A method for collecting a foamed resin according to the present invention includes passing a layered body between a pair of compression rollers arranged so as to oppose each other, the layered body including a foamed resin and a substantially incompressible plate-like object layered on at least one surface of the foamed resin, and compressing the layered body with the pair of compression rollers at this time, thereby peeling off the plate-like object from the foamed resin by utilizing the difference in transverse strain owing to the difference in Poisson's ratio for each material. Here, being "substantially incompressible" means having physical properties that can be judged to cause almost no change in thickness compared with the foamed resin, when compressed with the compression rollers. This collecting method makes it possible to separate the foamed resin and the plate-like object easily with a simple and small device. Furthermore, since it is appropriate that the layered body should have a shape and size that can pass between the compression rollers, the layered body does not have to be smashed minutely in advance. Moreover, since the foamed resin and the plate-like object hardly are smashed into small pieces even when the layered body passes between the compression rollers, both of them can be separated and then handled easily. Thus, processes can be simplified, and the foamed resin can be collected at low cost.

In the above-described collecting method, it is preferable that, at the time of compressing, substantially no foaming gas contained in the foamed resin leaks out. This eliminates the need for equipment for collecting the foaming gas, and thus, the foamed resin can be collected at low cost.

Also, in the above-described collecting method, the plate-like object may be a steel plate or a resin plate. Alternatively, the layered body may be formed by layering a steel plate on one surface of a plate-like foamed resin and a resin plate on the other surface thereof.

Furthermore, in the above-described collecting method, the layered body may be obtained by cutting a heat-insulating housing of a refrigerator. This makes it possible to apply the collecting method of the present invention to disassembly of a discarded refrigerator.

Moreover, in the above-described collecting method, a linear object may be embedded in the foamed resin, and in this case, the linear object preferably is separated from the foamed resin by passing the layered body between the pair of compression rollers. This makes it possible both to peel off the incompressible plate-like object and to separate the linear object from the foamed resin by utilizing the difference in Poisson's ratio. An example of such a linear object includes an object that has a wire shape or a tubular shape and is formed of a substantially incompressible material such as metal or resin.

In the above-described collecting method, it is preferable that the layered body is passed between the pair of compression rollers so that the plate-like object is sandwiched between the foamed resin and one of the compression rollers. This deforms the plate-like object when passing between the compression rollers, making it easier to peel off the plate-like object.

A peeling device according to the present invention includes a pair of compression rollers arranged so as to oppose each other, and a gap adjusting mechanism for adjusting a gap between the pair of compression rollers. When passing a layered body including a foamed resin and a substantially incompressible plate-like object layered on at least one surface of the foamed resin between the pair of compression rollers, the layered body can be compressed with the pair of compression rollers, thereby peeling off the plate-like object, and the gap between the pair of compression rollers is adjusted so that no foaming gas in the foamed resin leaks out. With this peeling device, it is possible to provide a simple and small device for separating the foamed resin and the plate-like object. Also, since the adjustment is made so that no foaming gas leaks out during compression, equipment for collecting the foaming gas becomes unnecessary, so that a small and low-cost device can be provided. Furthermore, since it is appropriate that the layered body should have a shape and size that can pass between the compression rollers, the layered body does not have to be smashed minutely in advance. Moreover, since the foamed resin and the plate-like object hardly are smashed into small pieces even when the layered body passes between the compression rollers, both of them can be separated and then handled easily. Thus, by using this device, peeling and separating operations of the plate-like object can be simplified, and the foamed resin can be collected at low cost.

A method for collecting a foaming gas according to the present invention includes passing a foamed resin between a pair of compression rollers arranged so as to oppose each other, and compressing the foamed resin with the pair of compression rollers at this time, thereby allowing a foaming gas in the foamed resin to leak out. The compressing with the compression roller allows a compressive force to concentrate on a small area, thereby breaking closed-cells in the foamed resin reliably. Also, since a belt-like region to which the compressive force is applied moves sequentially due to the rotation of the compression rollers, the closed-cells are broken sequentially, thereby squeezing out all the foaming gas contained therein. Because the foaming gas leaks out from a very narrow region in an opposing portion of the pair of compression rollers, it can be collected in a high concentration. Accordingly, a process for liquefying and condensing the foaming gas also can be simplified. In this manner, the foaming gas can be collected efficiently with small equipment at low cost.

In the above-described collecting method, it is preferable that the compressing with the compression rollers causes a compression fracture in a wall of a closed-cell in the foamed resin. In other words, an extremely heavy load is applied for compressing the foamed resin so that the compression fracture occurs in the wall of the closed-cell owing to a pressure of the foaming gas therein, thereby allowing the foaming gas to leak out stably.

In the above-described collecting method, it is preferable that the pair of compression rollers have different peripheral speeds. This makes it possible to apply a compressive force and a shearing force to the wall of the closed-cell, so that the closed-cell containing the foaming gas can be broken more easily.

Furthermore, in the above-described collecting method, the foamed resin may be obtained by disassembling a heat-insulating housing of a refrigerator. This makes it possible to apply the collecting method of the present invention to disassembly of a discarded refrigerator.

Moreover, in the above-described collecting method, it is preferable that the foamed resin directly contacts the compression rollers at the time of passing. This allows a compressive force and a shearing force from the compression rollers to act on the foamed resin directly, thereby breaking the closed-cells efficiently.

Next, a device for collecting a foaming gas according to the present invention includes a pair of compression rollers arranged so as to oppose each other, and a cover for covering at least an opposing portion of the pair of compression rollers. The pair of compression rollers allows a foaming gas contained in a foamed resin to leak out by passing the foamed resin therebetween while compressing the foamed resin, and the cover prevents a diffusion of the foaming gas that has leaked out. Here, the "opposing portion of the pair of compression rollers" refers to a portion in which the gap between the pair of compression rollers arranged so as to oppose each other is narrowest and its adjacent region, and indicates the portion contributing to the compression of the foamed resin. The compressing with the compression roller allows a compressive force to concentrate on a small area, thereby breaking closed-cells in the foamed resin reliably. Also, since a belt-like region to which the compressive force is applied moves sequentially due to the rotation of the compression rollers, the closed-cells are broken sequentially, thereby squeezing out all the foaming gas contained therein. Because the foaming gas leaks out from a very narrow region in the opposing portion of the pair of compression rollers and the cover prevents the diffusion of the foaming gas that has leaked out, the foaming gas can be collected in a high concentration. Accordingly, a process for liquefying and condensing the foaming gas can be simplified. In this manner, a small, low-cost and highly efficient device for collecting the foaming gas can be provided.

Then, a method for disassembling a refrigerator according to the present invention includes the processes of cutting and separating a heat-insulating housing of a refrigerator that uses a foamed resin as a heat insulator into pieces having a predetermined size and shape; obtaining the foamed resin by passing the pieces between a pair of compression rollers arranged so as to oppose each other and compressing the pieces with the pair of compression rollers at this time, thereby peeling off and separating an incompressible plate-like object layered at least on one surface of the pieces; and collecting a foaming gas by passing the foamed resin between a pair of compression rollers arranged so as to oppose each other and compressing the foamed resin with the pair of compression rollers at this time, thereby allowing the foaming gas in the foamed resin to leak out.

By using the compression rollers in the process of collecting the foamed resin, the foamed resin and the plate-like object can be separated easily with a simple and small device. Furthermore, in the process of cutting and separating the heat-insulating housing into the pieces, since it is appropriate that the pieces should have a shape and size that can pass between the compression rollers, they do not have to be cut minutely. Moreover, since the foamed resin and the plate-like object hardly are smashed into small pieces even when the pieces pass between the compression rollers, both of them can be separated and then handled easily.

Furthermore, in the process of collecting the foaming gas, the compressing with the compression roller allows a compressive force to concentrate on a small area, thereby breaking closed-cells in the foamed resin reliably. Also, since a belt-like region to which the compressive force is applied moves sequentially due to the rotation of the compression rollers, the closed-cells are broken sequentially, thereby squeezing out all the foaming gas contained therein. Because the foaming gas leaks out from a very narrow region in an opposing portion of the pair of compression rollers, it can be collected in a high concentration. Accordingly, a process for liquefying and condensing the foaming gas also can be simplified.

In this manner, the foaming gas can be collected in a high concentration, and a method for disassembling a refrigerator that can reduce equipment size and cost can be provided.

In the process of obtaining the foamed resin of the above-described disassembling method, it is preferable that substantially no foaming gas contained in the pieces leaks out. This eliminates the need for equipment for collecting the foaming gas.

Also, in the process of obtaining the foamed resin of the above-described disassembling method, it is preferable that the pieces are passed between the pair of compression rollers so that the plate-like object is sandwiched between the foamed resin and the compression roller. This deforms the plate-like object when passing between the compression rollers, making it easier to peel off the plate-like object.

Furthermore, in the process of collecting the foaming gas of the above-described disassembling method, it is preferable that the compressing of the foamed resin causes a compression fracture in a wall of a closed-cell in the foamed resin. A heavy load is applied for the compressing so that the compression fracture occurs in the wall, thereby allowing the foaming gas to leak out stably.

Moreover, in the process of collecting the foaming gas of the above-described disassembling method, it is preferable that the pair of compression rollers have different peripheral speeds. This makes it possible to apply a compressive force and a shearing force to the wall of the closed-cell, so that the closed-cell containing the foaming gas can be broken more easily.

BEST MODE FOR CARRYING OUT THE INVENTION (First Embodiment)

A method for peeling off a plate-like object from a layered body of a foamed resin and a substantially incompressible plate-like object layered thereon will be described by way of an example of disassembling a discarded refrigerator.

First, refrigerant gas (for example, chlorofluorocarbons) and refrigeration oil in a refrigerator to be disassembled are collected by a known method, and the compressor is removed. This can prevent the refrigerant gas from diffusing into the air in the subsequent cutting and separating process. Furthermore, it is preferable that a heat exchanger and an electric controller including circuit boards also are removed at this time. These operations can be conducted manually (the first separating process).

Next, after attachments such as the compressor are removed, a heat-insulating housing is cut and separated into a plurality of pieces.

The following is a description of an example of cutting/separating a two-door refrigerator.

Figure 1:
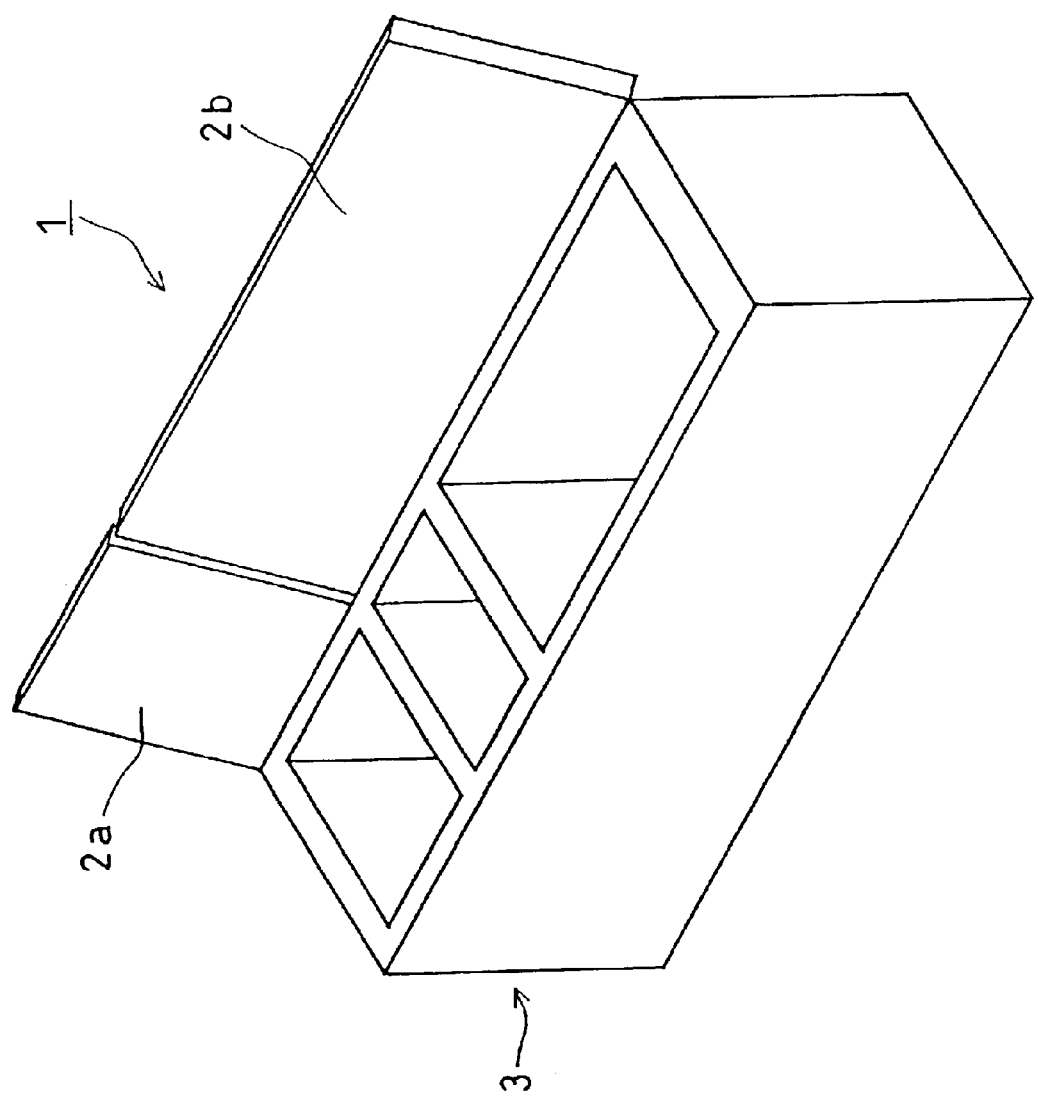
FIG. 1 is a schematic perspective view showing a heat-insulating housing of a two-door refrigerator.

FIG. 1 is a schematic perspective view showing a heat-insulating housing of the two-door refrigerator, which has been subjected to the above-described first separating process. A heat-insulating housing 1 includes an upper door 2a, a lower door 2b and a housing main body 3.

Figure 2:
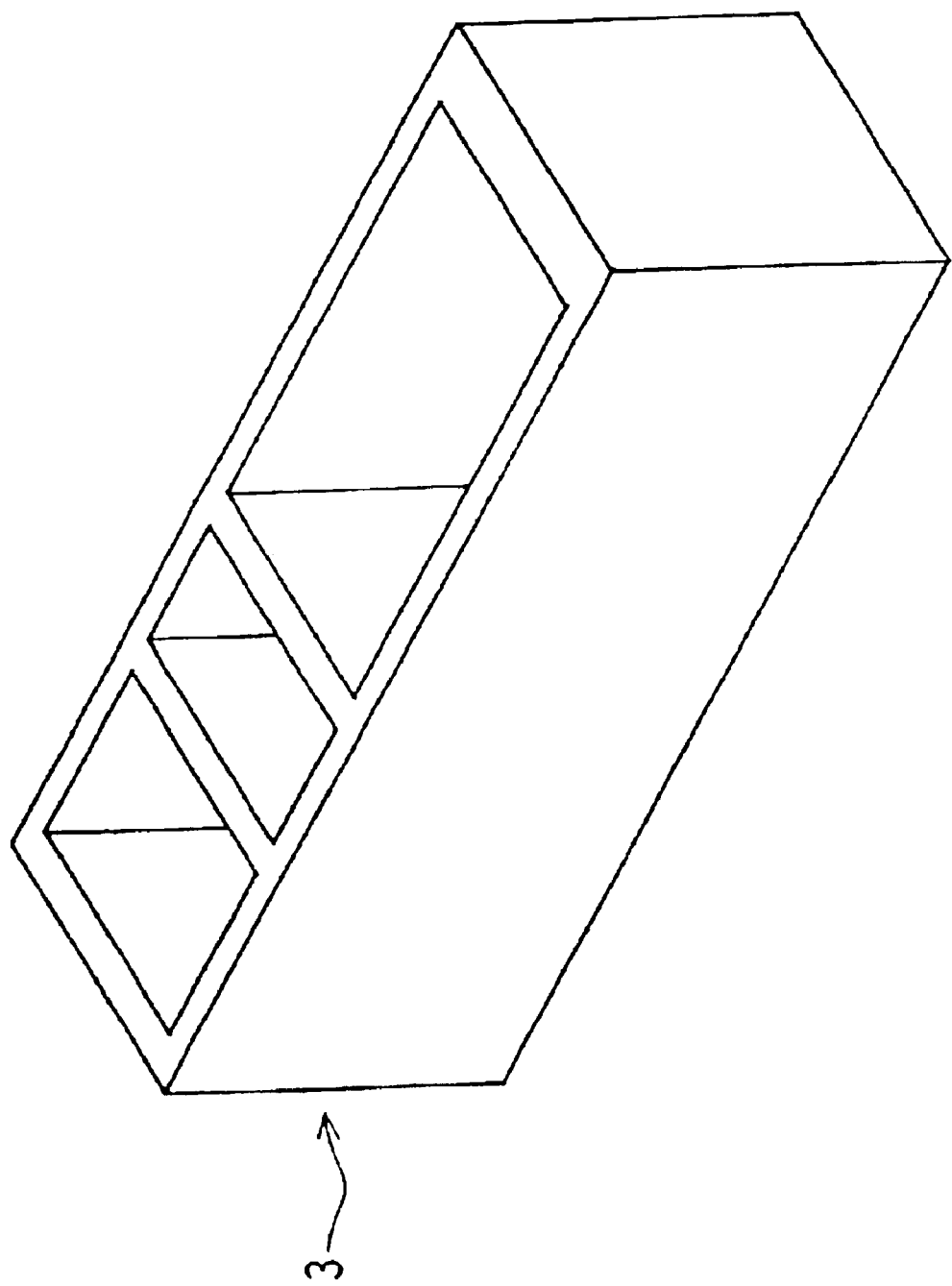
FIG. 2 is a schematic perspective view showing a housing main body obtained by removing doors from the heat-insulating housing of the two-door refrigerator.

First, as shown in FIG. 2, the upper door 2a and the lower door 2b are removed by cutting.

Figure 3:
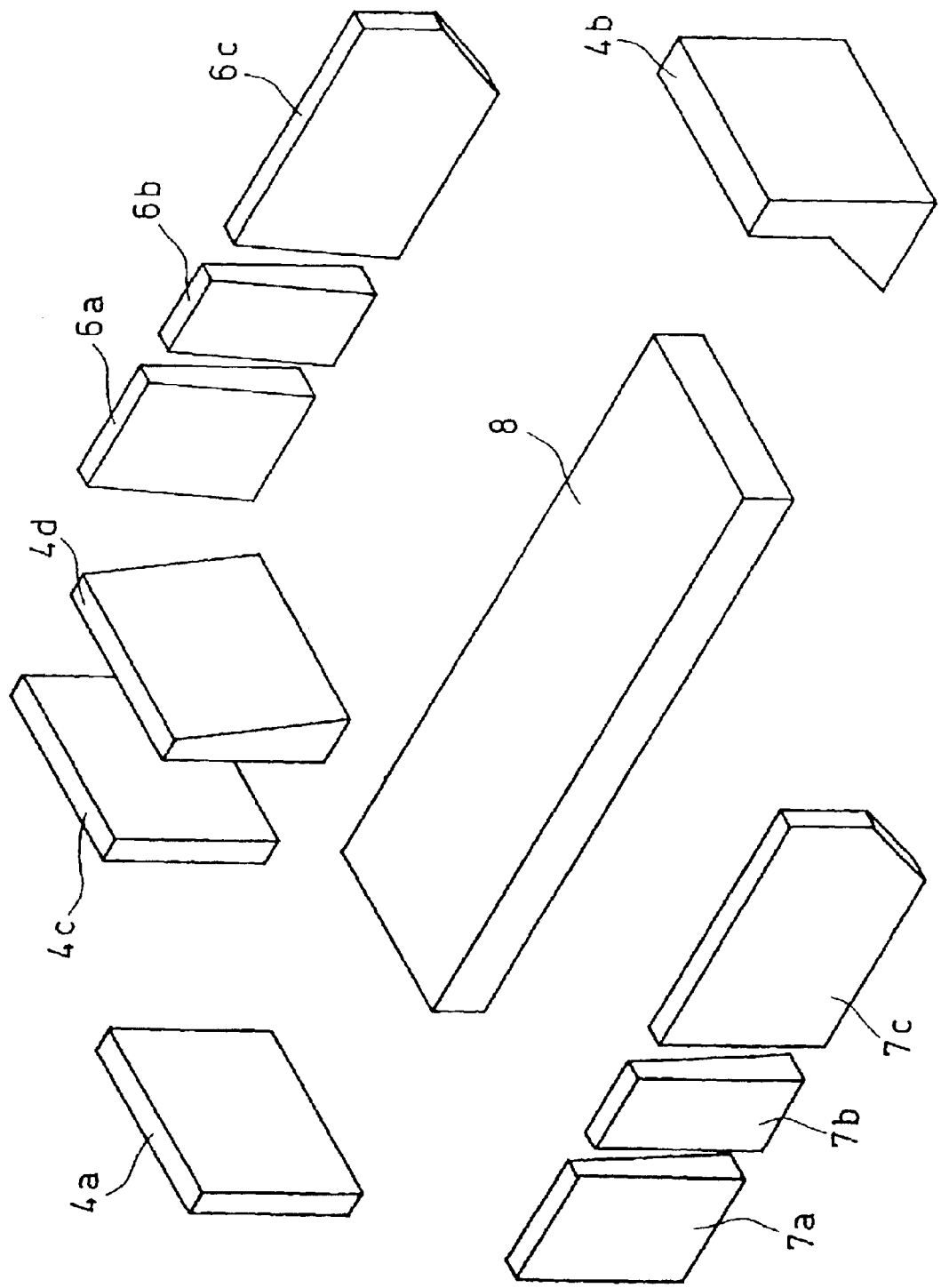
FIG. 3 is an exploded perspective view showing an example of cutting the heat-insulating housing of the refrigerator.

Then, as shown in FIG. 3 for example, the housing main body 3 is cut into substantially flat pieces of a top plate 4a, a bottom plate 4b, partition plates 4c and 4d, right side plates 6a, 6b and 6c and left side plates 7a, 7b and 7c and a back plate 8. The cutting positions are not limited to those shown in FIG. 3 as long as pieces having a size and shape that can be put into a peeling device described below can be obtained. It is not necessary to cut it into excessively small pieces. When the pieces are too small, not only does its cutting time take longer, but also a foaming gas contained in the foamed resin may leak out during cutting, and handling of the pieces may become complicated thereafter.

There is no particular limitation on the device for cutting the heat-insulating housing 3. However, since the heat-insulating housing 3 may be a composite material of metal, resin, etc. and an unknown component may be arranged at a position that cannot be seen from the outside, a cutting device shown in FIGS. 4 and 5 is used preferably.

Figure 4:
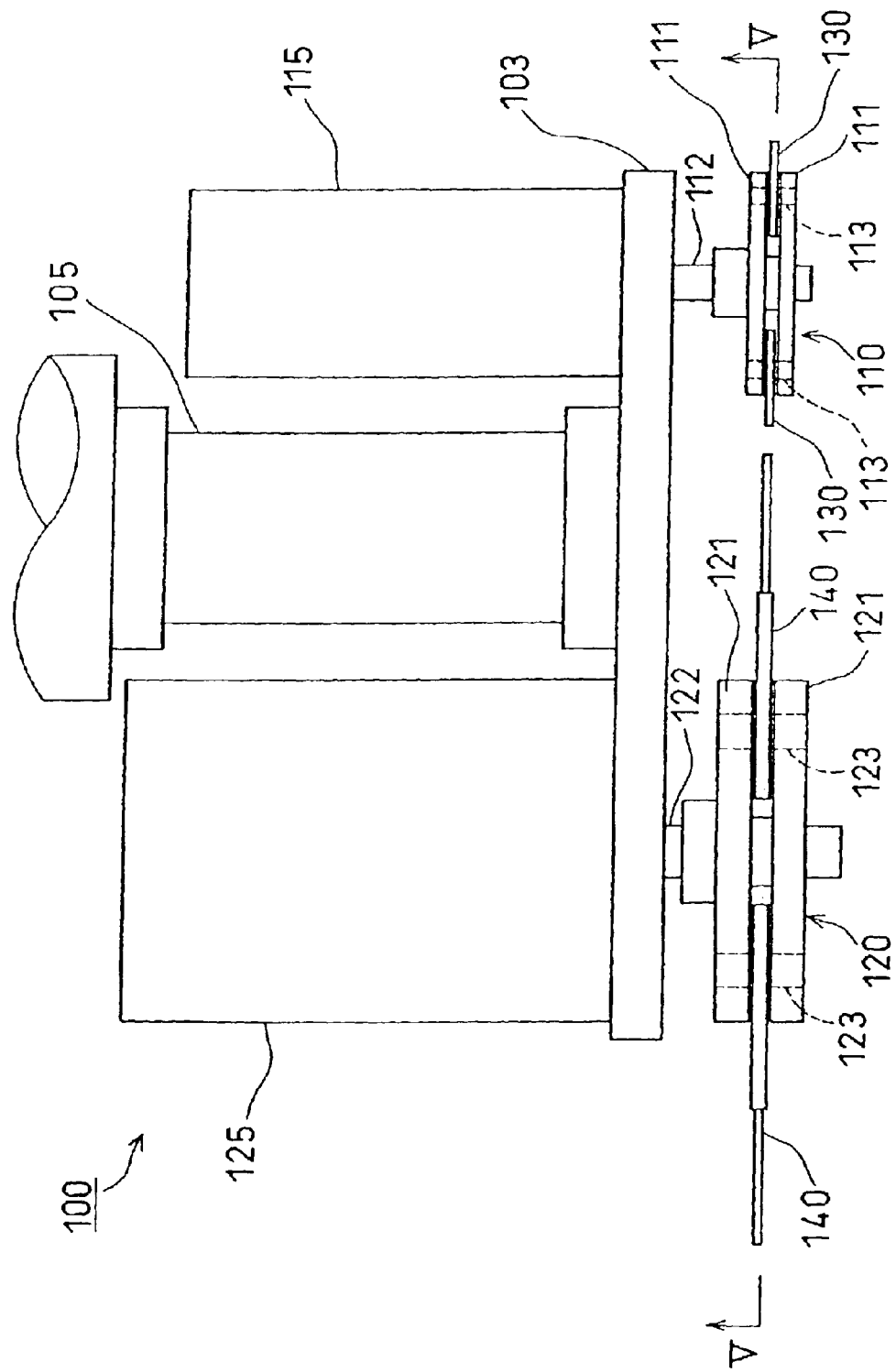
FIG. 4 is a top view showing a cutting device for cutting the heat-insulating housing of the refrigerator.
Figure 5:
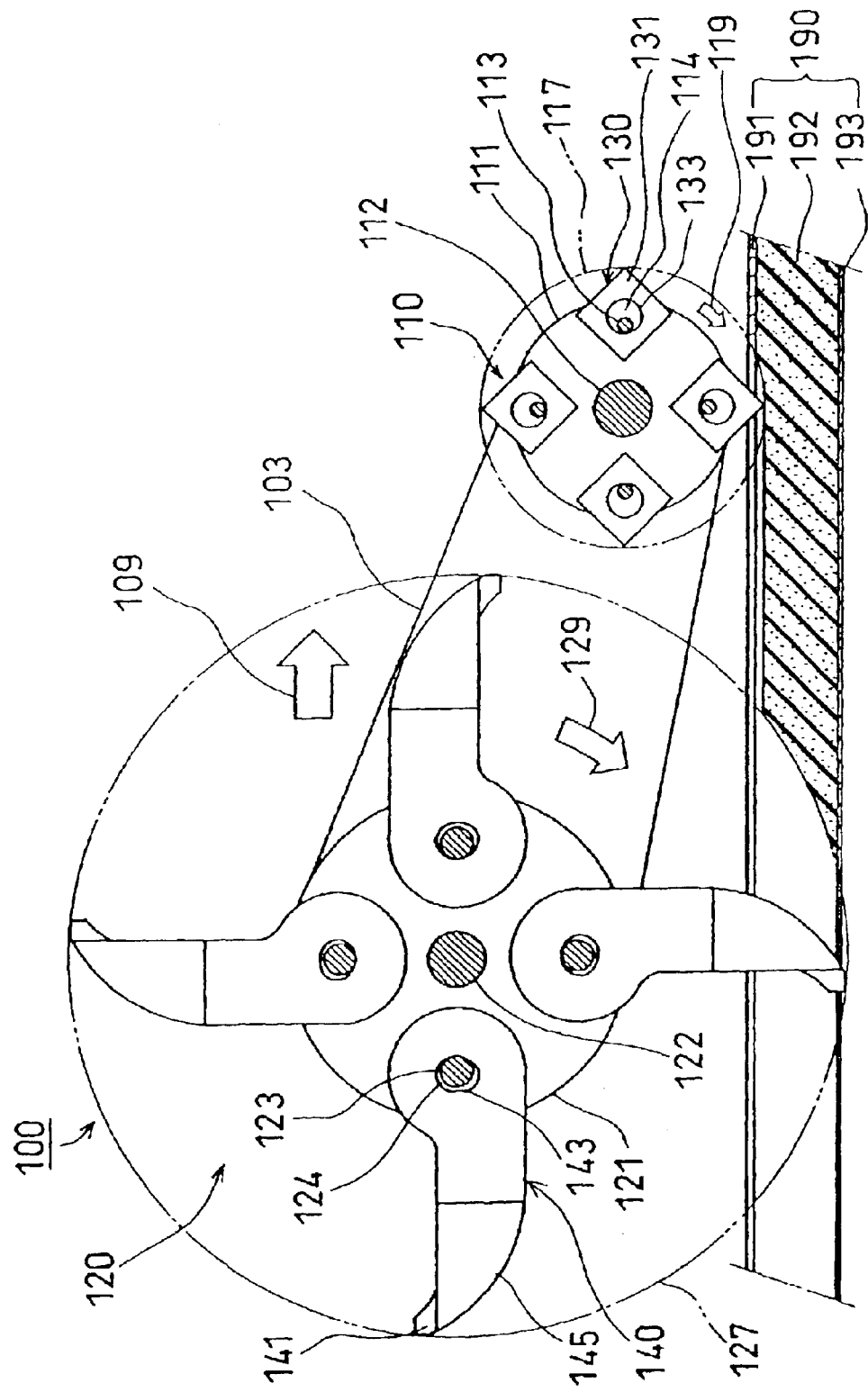
FIG. 5 is a sectional view taken along the line V—V in FIG. 4 seen in an arrow direction.

FIG. 4 is a top view showing the cutting device, and FIG. 5 is a sectional view thereof taken along the line V—V in FIG. 4 seen in an arrow direction, showing the state of cutting a heat-insulating housing 190 as well.

A cutting device 100 has a first rotating unit 110 and a second rotating unit 120 as shown in FIGS. 4 and 5.

The first rotating unit 110 has a pair of discs (rotors) 111, 111 that are spaced at a predetermined distance and attached to a main shaft 112 with their principal planes opposing each other, and impacting bodies (hard solid bodies) 130 mounted rotatably to spindles 113 provided between the pair of discs 111, 111. The main shaft 112 is connected to a rotating shaft of a driving motor 115, so that the first rotating unit 110 is rotated about the main shaft 112 serving as a rotational center. Four spindles 113 are provided on the circumference of a circle, whose center corresponds to this rotational center, in such a manner as to be spaced at equal angles.

Similarly, the second rotating unit 120 has a pair of discs (rotors) 121, 121 that are spaced away at a predetermined distance and attached to a main shaft 122 with their principal planes opposing each other, and impacting bodies (hard solid bodies) 140 mounted rotatably to spindles 123 provided between the pair of discs 121, 121. The main shaft 122 is connected to a rotating shaft of a driving motor 125, so that the second rotating unit 120 is rotated about the main shaft 122 serving as a rotational center. Four spindles 123 are provided on the circumference of a circle, whose center corresponds to this rotational center, in such a manner as to be spaced at equal angles.

The first rotating unit 110 and the second rotating unit 120 are held by a common base 103 so that the directions of the axes of rotation thereof are parallel and the principal planes of the discs 111 and the discs 121 are on substantially the same plane, in other words, so that a circular path 117 of cutting blades 131 at the tip of the impacting bodies 130 and a circular path 127 of cutting blades 141 at the tip of the impacting bodies 140 during the rotation substantially are on the same plane. The base 103 is mounted on a robot arm 105.

The impacting body 130 is formed of a plate member with a planar shape of a square and a predetermined thickness and has a through hole 133 in its central portion. Four corners 131 of the square plate member correspond to cutting blades in a conventional tool and impact on the heat-insulating housing. The impacting body 130 is attached to the rotating unit 110 by passing the spindle 113 through the through hole 133. The impacting body 130 is attached so that a part of its periphery (in particular, the cutting blade 131) is located beyond the periphery of the disc 111 when the rotating unit 110 rotates.

The impacting body 140 has a floating portion 145, a through hole 143 provided at one end of the floating portion 145 and the cutting blade 141 provided at the other end of the floating portion 145. The floating portion 145 has a shape approximate to a substantially-bow shape that is formed of a substantially circular-arc portion and a chord extending between both ends of the circular-arc. The cutting blade 141 is formed to be thick so as to be resistant to shock at the time of impacting on the heat-insulating housing. The peripheral portion of the through hole 143 is formed to be thick so as to be resistant to centrifugal force during rotation, and other portions are formed to be thin so as to reduce weight. The impacting body 140 is attached to the rotating unit 120 with its cutting blade 141 facing forward in the rotational direction by passing the spindle 123 through the through hole 143. As shown in FIGS. 4 and 5, the impacting body 140 is attached so that a part of its periphery (in particular, the cutting blade 141) is located beyond the periphery of the disc 121 when the rotating unit 120 rotates.

A predetermined fitting gap 114 is provided between the spindle 113 and the through hole 133 of the impacting body 130. Similarly, a predetermined fitting gap 124 is provided between the spindle 123 and the through hole 143 of the impacting body 140. By providing the fitting gaps 114, 124, the impacts on the cutting blades 131, 141 and the spindles 113, 123 are relieved when the impacting bodies impact on the heat-insulating housing 190 even though the rotors 111, 121 rotate at a high speed, thus preventing components of the rotating units 110, 120 such as the spindles from being damaged.

The following is a description of an example of cutting a heat-insulating housing by using the above-described cutting device 100. The description is directed to the case of cutting a heat-insulating housing 190 having a layered structure including a steel plate 191, a foamed resin (a heat insulator) 192 and a resin plate 193 in this order as shown in FIG. 5. The cutting device 100 and the heat-insulating housing 190 are arranged such that the directions of the axes of rotation of the main shafts 112, 122 are substantially parallel with a surface of the plate-like heat-insulating housing 190. Then, the cutting device 100 is moved in the direction indicated by an arrow 109 while rotating the first rotating unit 110 and the second rotating unit 120 at a high speed in the directions indicated by arrows 119, 129, respectively. The moving direction 109 is parallel with the principal planes of the discs 111, 121 and with the surface of the heat-insulating housing 190. Accordingly, the impacting bodies 130 of the first rotating unit 110 first impact on the steel plate 191 on the surface of the heat-insulating housing 190, and the steel plate 191 and a part of the upper portion of the foamed resin 192 are cut, so that a groove having a predetermined width and depth is formed on the upper surface of the heat-insulating housing 190. Subsequently, the impacting bodies 140 of the second rotating unit 120 advance along this groove, thus cutting the lower portion of the foamed resin 192 and the resin plate 193, which have not been subjected to the impacting bodies 130.

At this time, at least the impacting bodies 130 impacting on the steel plate 191, which is made of a high hardness material and difficult to cut, are allowed to impact at least at the critical impact velocity of a material of the steel plate 191.

The critical impact velocity varies depending on the materials. For instance, the critical impact velocities of aluminum, soft steel, stainless steel and titanium are about 49.7 m/second, 30.0 m/second, 152.3 m/second, and 61.8 m/second, respectively. Therefore, the impact velocity of the impacting body 130 can be changed according to the kind of object to be cut. The impact velocity of the impacting body preferably is set to be at least twice, further preferably at least three times, and particularly preferably at least four times as high as the critical impact velocity of the object to be cut, because this allows stable cutting. When the material of the object to be cut is unknown, it is preferable that the rotational speed of the first rotating unit 110 is set to be somewhat higher.

This cutting method is obtained by putting a theory into practical use as a cutting method; the theory is a plastic wave theory in which when a high-speed tensile force is applied to an object to be processed at least at a critical impact velocity, a fracture occurs immediately at the part where the force has been applied, or a theory in which when a high-speed compressive force is applied at least at a critical impact velocity, the ductility is deteriorated rapidly and thus the part where the force has been applied is broken even by a small distortion (a phenomenon similar to the embrittlement).

When an impacting body 130 that rotates at a high speed impacts on the steel plate 191 at least at the critical impact velocity of the steel plate 191 and then rebounds, the surface of the steel plate 191 in a highly limited portion including the part subjected to the impact by the impacting body and its vicinity is smashed (broken) instantaneously into a minute granular state or minute fragments.

The cutting device described above is characterized as follows.

(1) An extremely small amount of the frictional heat is generated at the part to be cut. In addition, the impacting body is air-cooled rapidly by its quick movement and thus the increase in temperature of the impacting body itself also is extremely small.

(2) The impacting body is subjected to work hardening by the impact on an object to be cut and therefore is hardened as it is used, thus increasing its abrasion resistance.

(3) The cutting resistance and the frictional resistance are low during cutting. As a result, a heat-insulating housing does not have to be held and fixed firmly during cutting. In addition, it is not necessary to provide a high stiffness for a spindle for supporting the impacting body, a rotor that rotates at a high speed, a main shaft, a bearing and a robot for holding the main shaft of the rotor.

(4) Even when a heat-insulating housing is formed of a plurality of different members (for example, metal, a resin-molded article, glass or ferrite), the heat-insulating housing can be cut continuously using the same cutting device.

Thus, compared with conventional cutting adopted in general by a band-shaped cutter (a band saw machine) or a disc-shaped cutter (a metal slitting saw), which is provided with a saw blade, by grinder cutting using a grinding tool in which abrasive grains are formed in a disc shape or in a cylindrical shape, or by gas cutting using an acetylene gas or the like, the above-described cutting device can cut an object continuously regardless of the material of the object to be cut, so that the cutting blade (the impacting body) has a far longer lifetime.

In the above example, the impacting bodies 140 of the second rotating unit 120 need not be allowed to impact at least at the critical impact velocity of the foamed resin 192 and the resin plate 193. Since the foamed resin 192 and the resin plate 193 have a low hardness and do not cause a brittle fracture easily, even when the impacting bodies 140 are allowed to impact at their critical impact velocities or lower, only the vicinity of the part subjected to the impact is smashed and can be cut easily.

Also, the heat-insulating housing 190 can be cut at one time or a plurality of times by a cutting device only having either of the first rotating unit 110 or the second rotating unit 120.

After being cut into substantially flat shapes as described above, pieces of the heat-insulating housing are sent into a peeling device, where the steel plate and the resin layer are peeled off and separated from the foamed resin.

Figure 6:
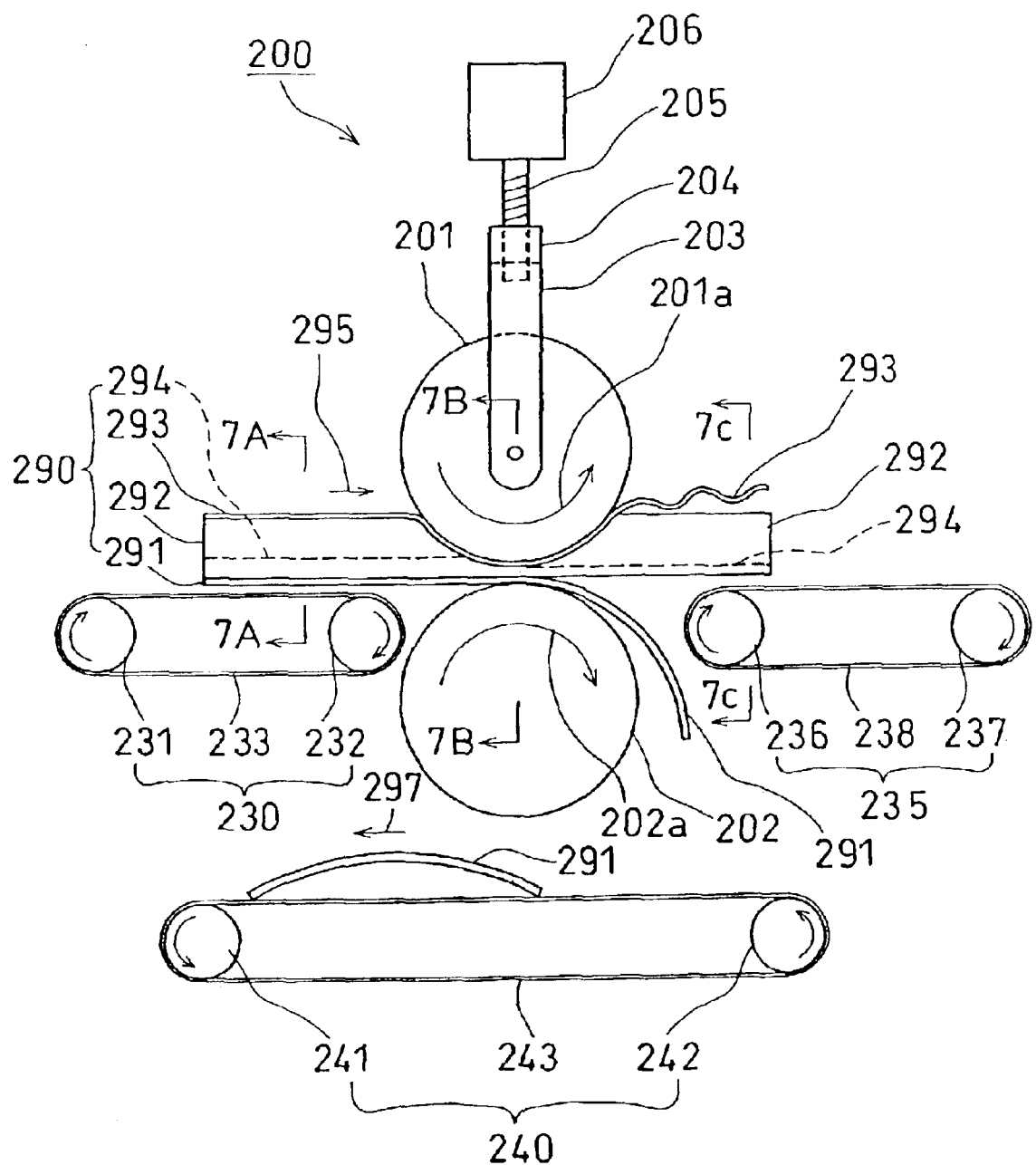
FIG. 6 is a side view showing a schematic configuration of a peeling device of the present invention.

FIG. 6 is a side view showing a schematic configuration of a peeling device of the present embodiment. A peeling device 200 has a pair of compression rollers 201, 202 that are spaced with its upper and lower rollers arranged in parallel and carrier devices 230, 235, 240.

The compression rollers 201, 202 respectively are driven rotationally in directions indicated by arrows 201a, 202b by driving mechanisms, which are not shown in the figure. Both ends of the lower compression roller 202 are held by a bearing mechanism, which is not shown in the figure, and the lower compression roller 202 rotates at a predetermined position. On the other hand, both ends of the upper compression roller 201 are supported by a support arm 203. An internal thread 204 is formed in an upper portion of the support arm 203, and the internal thread 204 engages with a lead screw 205, whose upper end is connected to a rotating shaft of a driving motor 206. By rotating the driving motor 206 forward and backward, it is possible to move the upper compression roller 201 vertically, so that the gap between the pair of compression rollers 201, 202 can be adjusted.

The carrier device 230 is a belt conveyor constituted by a pair of rollers 231, 232 rotating in the arrow directions and an endless belt 233 running between them. Similarly, the carrier device 235 is a belt conveyor constituted by a pair of rollers 236, 237 rotating in the arrow directions and an endless belt 238 running between them. The carrier devices 230, 235 are arranged so that the pair of compression rollers 201, 202 are interposed between them, and the upper surfaces of the carrier devices 230, 235 and the upper portion of the peripheral surface of the lower compression roller 202 are designed to be at substantially the same height.

The carrier device 240 is a belt conveyor constituted by a pair of rollers 241, 242 rotating in the arrow directions and an endless belt 243 running between them. The carrier device 240 is arranged below the lower compression roller 202.

The following is a description of an operation of the peeling device 200 configured as above in the present embodiment.

After being cut into a substantially flat shape as described above, each piece (layered body) 290 of the heat-insulating housing of the refrigerator is mounted on the carrier device 230 with the side of the steel plate 291 facing downward and carried in the direction indicated by an arrow 295. Thereafter, the piece 290 arrives at the position between the pair of compression rollers 201, 202. Since the gap between the pair of compression rollers 201, 202 is designed to be smaller than the thickness of the piece 290, the piece 290 is compressed by the compression rollers 201, 202. However, because of the incompressibility of the steel plate 291 and the resin plate 293, only the foamed resin 292 is compressed. In this case, it is compressed to the extent that closed-cells formed in the foamed resin 292 are not broken (in other words, within the range of elastic deformation of the foamed resin 292), and therefore, after the foamed resin 292 passes between the pair of compression rollers 201, 202, its thickness immediately recovers to nearly the same thickness as that before compression.

On the other hand, when passing between the pair of compression rollers 201, 202, the steel plate 291 deforms so as to have a curvature in the same direction as that of the outer peripheral surface of the lower roller 202. By the time it comes out from between the compression rollers 201, 202, the steel plate 291 has been peeled off at a joint interface with the foamed resin 292 and curled toward the side of the roller it contacts (the lower roller 202). This curled steel plate 291 passes through the gap between the lower roller 202 and the carrier device 235 and drops onto the carrier device 240. Thereafter, the steel plate 292 is carried in the direction indicated by an arrow 297 by the carrier device 240 and then collected.

After being compressed by the pair of compression rollers 201, 202, the resin plate 293 deforms irregularly at the time the foamed resin 292 recovers its thickness. By the time the resin plate 293 comes out from between the compression rollers 201, 202, it has been peeled off at a joint interface with the foamed resin 292 and deformed wavily. Accordingly, both of them can be separated easily.

Further, the behavior of a pipe (through which a refrigerant passes, for example) 294 embedded in the foamed resin 292 will be described, with reference to FIG. 7. FIGS. 7A, 7B and 7C are sectional views showing the piece 290 taken along the line 7A—7A, the line 7B—7B and the line 7C—7C in FIG. 6 seen in an arrow direction, respectively.

Figure 7A:
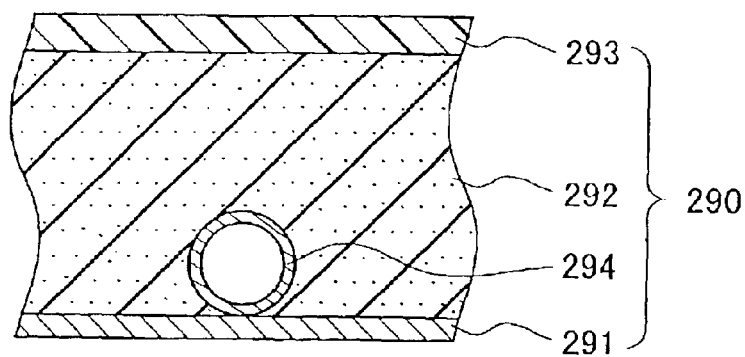
FIG. 7 illustrates how a piece including a foamed resin in which a pipe is embedded is compressed using the peeling device of the present invention, with FIG. 7A, FIG. 7B and FIG. 7C being sectional views showing the piece taken along the line 7A—7A, the line 7B—7B and the line 7C—7C in FIG. 6 seen in an arrow direction, respectively.
Figure 7B:
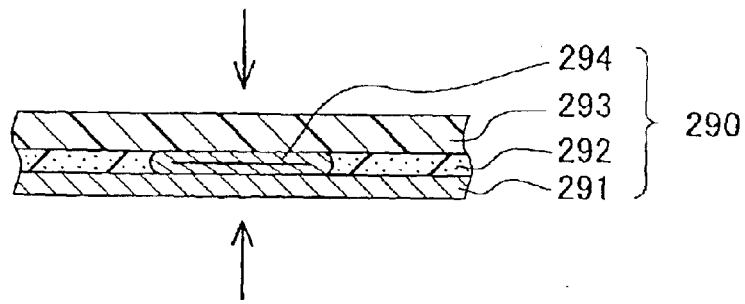
Figure 7C:
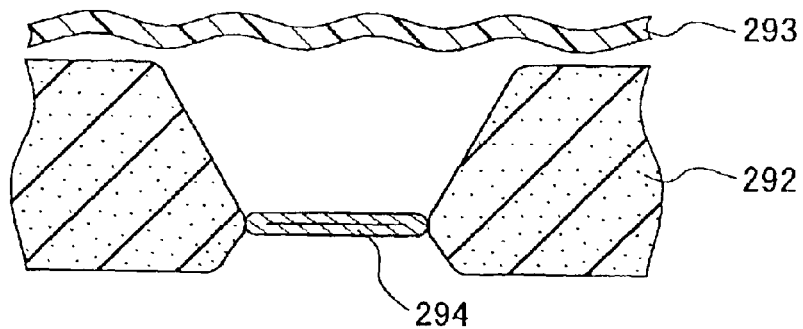

As shown in FIG. 7A, the pipe 294 through which a refrigerant passes, for example, sometimes is embedded in the foamed resin 292. The pipe 294 is made of a copper-based metal material, for example. When passing between the pair of compression rollers 201, 202, the pipe 294 is squashed substantially completely in the vertical direction and the foamed resin 292 is compressed to have a thickness substantially the same as that of the squashed pipe 294, as shown in FIG. 7B. At this time, the foamed resin 292 above and below the pipe 294 along the compressing direction is caught between the pipe 294 and the steel plate 291 above and between the pipe 294 and the resin plate 293 below and cut/separated right and left. As a result, when the foamed resin 292 recovers its thickness after passing between the compression rollers 202, 201, the foamed resin 292 is not present above or below the pipe 294 and separated on both sides of the pipe 294, as shown in FIG. 7C. Thus, the foamed resin 292 and the pipe 294 can be separated easily.

Although FIGS. 6 and 7 are directed to the case where the pipe 294 is embedded in the foamed resin 292, the present invention is not limited to the above. Even when a so-called linear object (for example, a tubular object such as a pipe, or a linear object in a narrow sense such as an electrical wiring) is embedded, the foamed resin 292 and the linear object can be separated easily after passing between the compression rollers 201, 202.

The following is a specific example. A heat-insulating housing of a discarded refrigerator was cut to obtain a piece 290. The piece 290 was a layered body of a 0.6-mm-thick steel plate 291 formed of a cold-rolled steel sheet, a 60-mm-thick foamed resin (urethane foam) 292 and a 0.8-mm-thick resin plate 293 formed of an ABS resin (acrylonitrile-butadiene-styrene copolymer), and a copper pipe 5 mm in outer diameter and 4 mm in inner diameter was embedded in the foamed resin 292. The piece had a substantially rectangular planar shape of about 50 cm×about 10 cm, length by width. This piece 290 was passed between the compression rollers 201, 202 of the peeling device 200 shown in FIG. 6 and compressed so as to achieve a total thickness of about 1.5 mm. When coming out from between the compression rollers 201, 202, the steel plate 291 was curled toward the roller it contacted, the resin plate 293 deformed wavily in an irregular manner, and both of them were separated from the foamed resin 292. Furthermore, the embedded pipe 294 was broken by pressure, and therefore, could be separated easily from the foamed resin 292 with a slight force. The foamed resin 292 after the compression recovered its thickness to about 30 to 40 mm.

In the separating device of the present embodiment, there is no particular limitation on the gap between the compression rollers 201, 202 when passing the piece 290 therethrough. However, it is preferable that the gap is within the range that the foamed resin 292 and other members (namely, the steel plate 291, the resin plate 293 and the linear object 294) can be separated and that the closed-cells in the foamed resin 292 are not broken to cause the foaming gas to leak out, as described above. An excessively small amount of compression cannot separate the foamed resin 292 and the other members, while an excessively large amount of compression breaks the closed-cells, thus releasing the foaming gas (for example, chlorofluorocarbons). Although a specific value of the gap between the compression rollers 201, 202 varies depending on the structure of the piece 290 serving as a material to be compressed and a deflection of the compression rollers 201, 202 during compression, it preferably is designed to be about 1.3 to 2.0 mm in the case of the above example.

The arrangement of the compression rollers is not limited to the configuration of FIG. 6 as long as at least one pair of compression rollers that are arranged to oppose each other can compress the piece. For example, on the opposite side of the piece 290 with respect to the compression rollers 201, 202 contacting the piece 290 directly, a back-up roll may be provided for preventing a deflection of the compression rollers 201, 202. A so called crown roll, whose central diameter is larger than the diameter on both ends in its width direction also may be used for achieving a compressive force that is uniform along the width direction. Furthermore, the pair of compression rollers 201, 202 opposing each other may have a different outer diameter.

In addition, the carrier devices 230, 235 and 240 do not have to be the belt conveyor as shown in FIG. 6, but can be a roller conveyor, for example, or other known carrier mechanisms.

Moreover, FIG. 6 is directed to the configuration in which the steel plate 291 is placed on the lower side, so that the steel plate 291 curled after passing between the compression rollers 201, 202 is allowed to pass between the lower roller 202 and the carrier device 235 and separated. However, it also may be possible to deliver the steel plate 291, the foamed resin 292 and the resin plate 293 in a layered state on the carrier device 235 and separate them afterwards.

There is no particular limitation on how to separate the foamed resin 202 and the other members after allowing them to pass between the compression rollers 201, 202. For example, they may be separated manually or by a robot or by using a known wind-power separation method utilizing a difference in density.

Although the above embodiment is directed to an example of using the piece 290 in which the steel plate 291 and the resin plate 293 respectively are layered on the front and back surfaces of the foamed resin 292, a piece in which either one of the steel plate 291 or the resin plate 293 only is layered can be separated similarly.

Furthermore, although the piece obtained by cutting the heat-insulating housing of the discarded refrigerator is used as the piece 290 in the above embodiment, the peeling device and the method for collecting the foamed resin according to the present embodiment are not limited to the above application, but can be applied widely to the cases where a layered body including a foamed resin and other plate-like incompressible object layered thereon (for example, a door panel of a car) is to be separated into the foamed resin and the other plate-like object.

As described above, according to the separating device 200 of the present embodiment, the foamed resin and other members can be separated while generating substantially no foaming gas. Consequently, a cover for preventing the diffusion of the foaming gas need not be provided around the separating device 200, and large equipment for collecting low-concentration chlorofluorocarbons is not needed. Thus, there is no need for a wide space for installing such equipment. Furthermore, since the piece 290 to be compressed appropriately has a size and shape that can be compressed between the compression rollers 201, 202 and does not have to be cut minutely, only a small cutting amount of a discarded product (the heat-insulating housing of the refrigerator in the above example) is required, making it possible to minimize the amount of the foaming gas leaking out during cutting. In addition, the foamed resin 292 and other members are not cut minutely by compression, so that the subsequent separating operation and the handling operation such as carrying become easier. As described above, according to the present embodiment, the foamed resin can be separated and collected efficiently at low cost with a simple configuration while saving space.

(Second Embodiment)

The following is a description of a method for collecting a foaming gas from a foamed resin.

Figure 8:
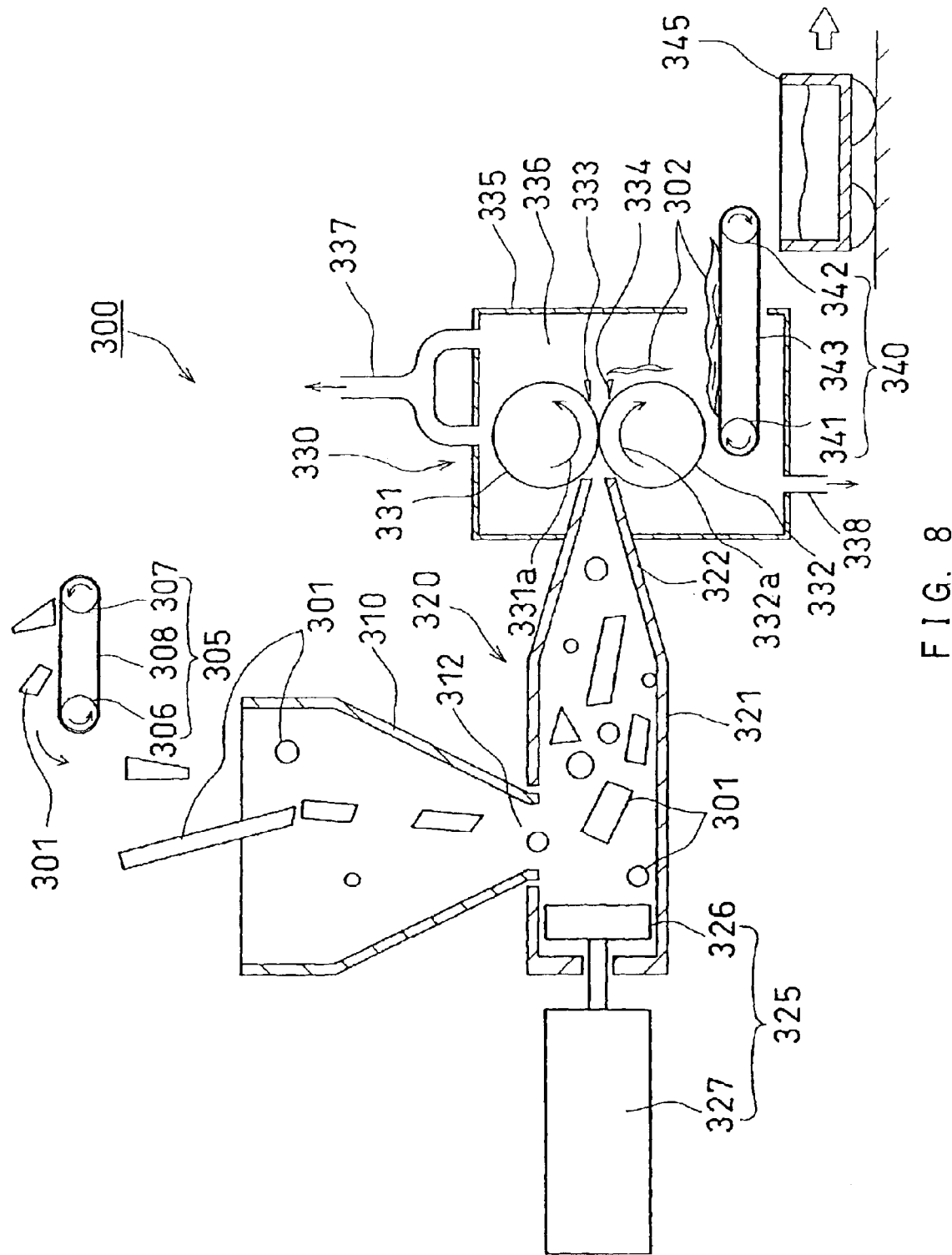
FIG. 8 is a sectional view showing a schematic configuration of a device for collecting a foaming gas of the present invention.

FIG. 8 shows a schematic configuration of a collecting device of a foaming gas.

A collecting device 300 of a foamed resin has a compressing device 330 for compressing a foamed resin 301, breaking closed-cells present in the foamed resin 301 and allowing a foaming gas therein to leak out and a feeder 320 for supplying the foamed resin to the compressing device 330.

The feeder 320 has a feeding portion 321 whose one end is connected to the compressing device 330 and a sending portion 325 for sending the foamed resin 301 in the feeding portion 321 to the side of the compressing device. The feeding portion 321 is a substantially hollow cylinder and its one end is provided with a funnel portion 322 whose diameter decreases gradually. A front-end opening of the funnel portion 322 is connected to the compressing device 330. The other end of the feeding portion 321 is provided with the sending portion 325. An upper portion of the feeding portion 321 on the side closer to the sending portion 325 is provided with an opening, which is connected to a lower opening 312 of a hopper 310. The sending portion 325 includes a piston 326 for moving the foamed resin 301 supplied into the feeding portion 321 toward the compressing device 330 and an actuator 327 (for example, a hydraulic cylinder, or a driving motor and a feed screw) for reciprocating the piston 326.

The hopper 310 temporarily stores the foamed resin 301 received from the upper opening and supplies it to the feeding portion 321 via the lower opening 312. The lower opening 312 is provided with a valve (not shown). A carrier device 305 is disposed above the upper opening of the hopper 310. The carrier device 305 is a belt conveyor constituted by a pair of rollers 306, 307 rotating in the arrow directions and an endless belt 308 running between them.

The compressing device 330 has a pair of compression rollers 331, 332 for compressing the foamed resin 301. The pair of compression rollers 331, 332 are arranged with its upper and lower rollers being in parallel and driven rotationally in directions indicated by arrows 331a, 332b by driving mechanisms, which are not shown in the figure. On the receiving side of an opposing portion of the pair of compression rollers 331, 332, the front-end opening of the funnel portion 322 is arranged. On the delivering side of the opposing portion of the pair of compression rollers 331, 332, squeegees 333, 334 for removing deposits on the roll surface are provided in such a manner as to contact outer peripheral surfaces of the compression rollers 331, 332, respectively. The gap or compressive force of the pair of compression rollers 331, 332 can be adjusted. Although their specific adjusting mechanism is not limited particularly, a mechanism similar to the mechanism for adjusting the gap between the compression rollers 201, 202 shown in FIG. 6 can be applied, for example.

A carrier device 340 is disposed below the lower compression roller 332. The carrier device 340 is a belt conveyor constituted by a pair of rollers 341, 342 rotating in the arrow directions and an endless belt 343 running between them. The carrier device 340 carries a foamed resin 302 compressed by the compression rollers 331, 332 to the outside of the compressing device 330.

A compressing chamber 336 including the compression rollers 331, 332 is covered with a cover 335. Upper and lower portions of the cover 335 are provided with suction ducts 337, 338, respectively, whose tips are connected to a bag filter, a suction pump, a condenser and a gas collecting tank sequentially (not shown).

The following is a description of an operation of the collecting device 300 of the foaming gas of the present embodiment configured as described above.

The foamed resin 301 is carried by the carrier device 305 and drops from an end of the carrier device 305 into the upper opening of the hopper 310. The foamed resin 301 may be the foamed resin 292 obtained by the first embodiment (obtained by removing the members other than the foamed resin 292, such as the steel plate 291 and the resin plate 293) or a foamed resin obtained by smashing a heat-insulating housing of a discarded refrigerator roughly into pieces having a size on the order of several cm and then separating/removing the steel plate and the resin plate, as described in the section of Background Art. Alternatively, it may be a foamed resin obtained by other methods or a foamed resin used for an application other than the heat-insulating housing of the refrigerator (for example, a door panel of a car). In any cases, it is preferable that an incompressible member with a certain size or larger (for example, a member formed of metal or resin) should be removed in advance by a wind-power separation, because such an incompressible member contained together with the foamed resin 301 lowers a compressing efficiency of the foamed resin 301.

The foamed resin 301 that has been put into the hopper 310 drops from the lower opening 312 into the feeding portion 321 by gravity. The foamed resin 301 in the feeding portion 321 is sent to the side of the funnel portion 322 by the piston 326 of the sending portion 325, passes through the front-end opening of the funnel portion 322 and then is supplied to the opposing portion of the pair of compression rollers 331, 332. When passing between the compression rollers 331, 332, the foamed resin 301 is compressed so that closed-cells therein are destroyed, thus releasing the foaming gas inside the closed-cells. By compressing the foamed resin 301 with the rollers, it is possible to apply a heavy load to a minute belt-like region and further to generate a micro shearing force caused by the roller rotation, allowing the closed-cells in the foamed resin 301 to be broken easily and reliably. Also, since the belt-like region to which the compressive force is applied moves sequentially due to the rotation of the compression rollers, the closed-cells are broken sequentially, thereby squeezing out all the foaming gas contained therein.

The extracted foaming gas gathers in the upper or lower portion inside the cover 335 according to its density and then is collected through the suction pipes 337, 338.

On the other hand, the foamed resin 302 that has been compressed is peeled off from the surfaces of the compression rollers 331, 332 by the squeegees 333, 334 and drops onto the carrier device 340. Subsequently, the foamed resin 302 is carried to the outside of the compressing device 330 by the carrier device 340, loaded on a trolley 345 and collected.

As described above, in accordance with the collecting device 300 of the foamed resin of the present embodiment, the cover 335 covering the compressing chamber 336 is provided, thereby preventing the diffusion of the foaming gas. Furthermore, since the foaming gas is extracted by compressing the foamed resin by the compression rollers 331, 332 and breaking walls of the closed-cells inside, an inner volume of the compressing chamber 336 can be made relatively small. Moreover, after being compressed, the foamed resin 302 is not smashed minutely and, therefore, can be carried using the carrier device 340 instead of a conventional air carrying. Thus, the foaming gas does not become diluted to have a low concentration in the air. In this manner, the foaming gas can be collected in a high concentration. Consequently, a subsequent operation of liquefying, condensing and separating the foaming gas from the air containing the foaming gas becomes easier, and simple equipment is sufficient for this operation. This makes it possible to reduce the equipment size and cost.

Furthermore, since the foaming gas can be extracted simply by supplying the foamed resin 301 to the position between the compression rollers 331, 332 and compressing it, the foamed resin 301 may be any foamed resin as long as it has a size and shape that can be supplied to the position between the compression rollers 331, 332 and compressed. It does not have to be smashed minutely into pieces having a size on the order of several cm as in a conventional manner. Therefore, a pretreatment process of the foamed resin 301 can be simplified. Moreover, the foamed resin 301 can be carried by the carrier device 305 such as a belt conveyor as in the present embodiment instead of a wind power, making it possible to simplify a carrying path and reduce equipment cost.

In the present embodiment, the compression rollers 331, 332 should have different rotational speeds; it is preferable that they are rotated so that their peripheral speeds are about 20% to 40% different. This makes it possible to apply the compressive force and the shearing force to walls of closed-cells in the foamed resin 301, thereby breaking these closed-cells more reliably.

In order to prevent the slip between the peripheral surfaces of the compression rollers 331, 332 and the foamed resin 301 and generate the above-mentioned shearing force reliably, a roughness similar to that formed for knurling (for example, meshed grooves, longitudinal grooves, oblique grooves, dotted protrusions or recesses) may be formed on the peripheral surfaces of the compression rollers 331, 332.

Since incompressible members such as a steel plate, a resin plate and a linear object are removed in advance from the foamed resin 301 to be put into the collecting device 300 of the present embodiment even if the foamed resin is obtained, for example, from a heat-insulating housing of a discarded refrigerator, it is possible to prevent a problem that such members are sent between the compression rollers 331, 332 together with the foamed resin 301 so that the foamed resin 301 is not compressed sufficiently. In addition, since the compression rollers 331, 332 compress the foamed resin 301 in a direct contact therewith, it is possible to apply a local compressive force and the above-mentioned shearing force by the compression rollers 331, 332 to the foamed resin 301 directly, producing a large effect of breaking the closed-cells in the foamed resin 301.

Although the gap or compressive load between the compression rollers 331, 332 during operation may be changed according to the foamed resin 301 to be processed, it is generally preferable that, when no foamed resin 301 is present between the rollers, both the rollers are brought into close contact with each other and a predetermined load further is applied between both the rollers. The walls defining innumerable closed-cells in the foamed resin are highly elastic, and the foaming gas contained therein also is compressible. Thus, under a light load, it is difficult to break the walls and cause the foaming gas to leak out. It is preferable that the compression rollers apply a heavy local load so as to generate a pressure of the foaming gas extremely high enough to cause a compression fracture (not a tensile fracture) in the walls of the closed-cells.

The following is a specific example. Metal rollers 40 cm in outer diameter and 40 cm in effective length were used as the compression rollers 331, 332, and a load of 294000 N in total was applied to bearing portions at both ends of the rollers while both the rollers were kept in close contact with each other. The rotational speeds of the compression rollers 331, 332 were 300 rpm and 400 rpm, respectively. The foamed resin 292 obtained in the example in the first embodiment, from which the steel plate 291, the resin plate 293 and the pipe 294 were removed, was supplied to the position between the compression rollers 331, 332 and compressed. Chlorofluorocarbons contained therein were released in the compressing chamber 336 at the time of compression, sucked through the suction pipe 337 and condensed, thus collecting chlorofluorocarbons. In addition, when the compressed foamed resin was closely observed, all the closed-cells were broken and no chlorofluorocarbons remained.

In the above embodiment, the arrangement of the compression rollers is not limited to the configuration of FIG. 8 as long as at least one pair of compression rollers that are arranged to oppose each other can compress the piece. For example, on the other side of the foamed resin 301 with respect to the compression rollers 331, 332 contacting the foamed resin 301 directly, a back-up roll may be provided for preventing a deflection of the compression rollers 331, 332. A so called crown roll, whose central diameter is larger than the diameter on both ends in its width direction also may be used for achieving a compressive force that is uniform along the width direction. Furthermore, the pair of compression rollers opposing each other may have a different outer diameter. It also may be possible to adopt a configuration in which, instead of compressing the foamed resin 301 only once with a pair of compression rollers, plural pairs of opposing compression rollers are arranged so as to compress the foamed resin 301 at plural times.

In addition, the structure of the cover 335 is not limited to FIG. 8. It may be any structure as long as at least the opposing portion of the compression rollers 331, 332 can be covered and the foaming gas released from the compressed foamed resin 301 can be prevented from diffusing. For example, a container for receiving the compressed foamed resin 302 is placed below the ejecting side of the compression rollers 331, 332, an openable door is provided at the exit of the container, so that the compressing chamber 336 is sealed completely by the cover 335 and the door during compression.

Although the above-described device uses the squeegees 333, 334 for cleaning the compression rollers 331, 332, there is no particular limitation on the tool and other tools, for example, a brush may be used as long as it can remove deposits on the roller surface.

In addition, the carrier devices 305 and 340 do not have to be the belt conveyor as shown in FIG. 8, but can be a roller conveyor, for example, or other known carrier mechanisms.

(Third Embodiment)

A method for disassembling a discarded refrigerator of the present embodiment includes the processes of cutting a heat-insulating housing of a refrigerator into a plurality of pieces described in the first embodiment, taking out a foamed resin as a heat insulator from the pieces and collecting a foaming gas from the foamed resin.

It is preferable that the heat-insulating housing of the refrigerator is cut using the cutting device 100 (FIGS. 4 and 5) described in the first embodiment. Also, the process of removing a steel plate, a resin plate etc. from the cut pieces and taking out the foamed resin is carried out using the peeling device 200 (FIG. 6) described in the first embodiment. Furthermore, the foaming gas is collected using the collecting device 300 of the foaming gas described in the second embodiment. Such a configuration makes it possible to collect the foaming gas efficiently. Compared with a conventional disassembling device, equipment can be miniaturized considerably. Moreover, since the equipment itself is simple and needs only a small installation space, the disassembling operation can be conducted at low cost.

In the above, it is preferable that the cutting device 100, the peeling device 200 and the collecting device 300 are connected by known carrier devices (for example, a belt conveyor, a transfer robot or the like). This makes it possible to automate or semiautomate the carrying between the devices, increasing a disassembling efficiency.

Furthermore, the cutting device 100 is attached to an arm of a robot with a multi-axis control function, and when the heat-insulating housing of the refrigerator arrives in front of the robot, which is detected automatically, the cutting device is rotated and driven. Thus, the heat-insulating housing is cut and processed by the multi-axis control function of the robot. At this time, the above-mentioned equipment preferably is provided with a following control device (not shown in the figure). The control device detects at least one of an intrinsic oscillatory waveform and an intrinsic oscillation frequency that are caused by the impact of the impacting bodies of the cutting device 100 against the heat-insulating housing, the load on the driving motor and an outer shape of the heat-insulating housing and controls and changes at least one of the rotational speed of each rotating unit (the impact velocity of the impacting bodies) of the cutting device 100, a cutting depth and a relative speed (a feed speed) and a relative moving direction (for example, when the cutting is judged to be difficult, the cutting device 100 is reversed slightly) between the rotating unit and the heat-insulating housing. In this manner, even when the heat-insulating housing is formed of a plurality of members with different physical properties, even when the material of the heat-insulating housing is unknown, or even when the internal structure of the heat-insulating housing that cannot be seen from the outside is unknown, optimum cutting conditions can be set automatically, thus achieving the automation of the cutting work.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for collecting a foamed resin comprising:

passing a layered body between a pair of compression rollers arranged so as to oppose each other, the layered body including a foamed resin and a substantially incompressible plate-like object layered on at least one surface of the foamed resin; and compressing the layered body with the pair of compression rollers at this time, thereby peeling off the plate-like object from the foamed resin, wherein a linear object is embedded in the foamed resin, and the linear object is separated from the foamed resin by passing the layered body between the pair of compression rollers.

2. The method for collecting a foamed resin according to claim 1, wherein, at the time of compressing, substantially no foaming gas contained in the foamed resin leaks out.

3. The method for collecting a foamed resin according to claim 1, wherein the plate-like object is a steel plate or a resin plate.

4. The method for collecting a foamed resin according to claim 1, wherein the layered body is formed by layering a steel plate on one surface of a plate-like foamed resin and a resin plate on the other surface thereof.

5. The method for collecting a foamed resin according to claim 1, wherein the layered body is obtained by cutting a heat-insulating housing of a refrigerator.

6. The method for collecting a foamed resin according to claim 1, wherein the layered body is passed between the pair of compression rollers so that the plate-like object is sandwiched between the foamed resin and one of the compression rollers.

* * * * *